Aug. 17, 1926.

T. E. MURRAY 1,596,114

PRODUCTION OF LINED PIPE FITTINGS AND THE LIKE

Filed June 6, 1924    2 Sheets-Sheet 1

Inventor
Thomas E. Murray
By his Attorney

Aug. 17, 1926.   1,596,114
T. E. MURRAY
PRODUCTION OF LINED PIPE FITTINGS AND THE LIKE
Filed June 6, 1924    2 Sheets-Sheet 2

Inventor
Thomas E. Murray
By his Attorney

Patented Aug. 17, 1926.

1,596,114

UNITED STATES PATENT OFFICE.

THOMAS E. MURRAY, OF BROOKLYN, NEW YORK.

PRODUCTION OF LINED PIPE FITTINGS AND THE LIKE.

Application filed June 6, 1924. Serial No. 718,218.

The invention aims to provide a lined pipe fitting, valve casing or the like which can be economically produced and which has certain other advantages referred to in detail hereinafter. The accompanying drawings illustrate embodiments of the invention.

Figure 1:
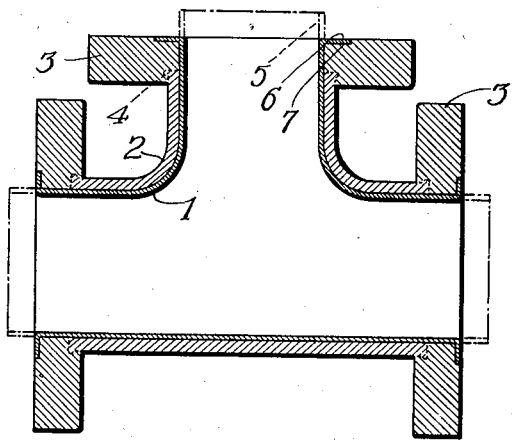
Fig. 1 is a longitudinal section of a T.
Figure 2:
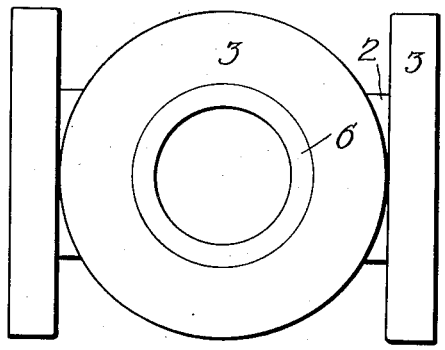
Fig. 2 is a plan of the same.

Referring to Fig. 1, a lining 1 is provided of non-corrodible metal such as brass or other cuprous metal. Surrounding this is a body 2 of comparatively light sheet steel or other ferrous metal, on the ends of which are mounted flanges or end pieces 3 of heavier steel or it may be of brass or other metal, attached thereto by welded interlocked joints 4 made in a manner analogous to that described in my previous application Serial No. 616,032. The lining is made originally of such dimensions that its ends project as at 5 beyond the end pieces 3 of the outer shell. After the latter is assembled about the lining the ends 5 are spun or pressed down to form flanges 6 lying in recesses 7 in the faces of the end pieces.

Figure 4:
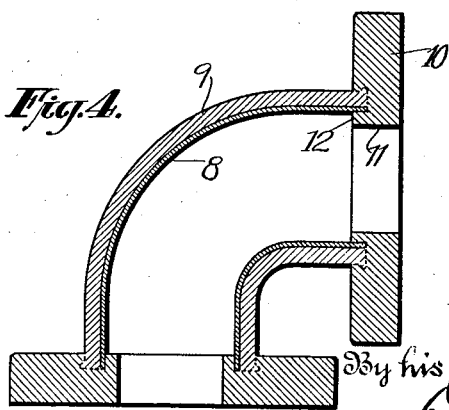
Fig. 4 is a section of an elbow.
Figure 5:
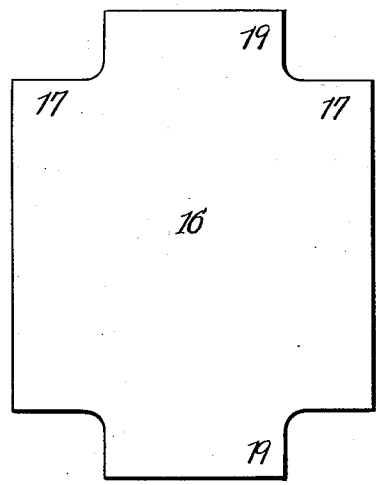
Fig. 5 is a blank from which the lining may be formed.

According to Fig. 4, the lining 8 coincides in extent only with the body 9 of the outer shell, leaving the end pieces 10 exposed on their faces and on their inner edges 11. The margins 12 of the end pieces projecting beyond the inner faces of the body and lining may be wide enough to permit the cutting of threads of different diameters to adapt the fitting to pipes of different sizes.

Fig. 4 shows the improvements applied to an elbow. It is to be understood, however, that the arrangement of the parts of Fig. 1 and of Fig. 4 may each be applied to a great variety of fittings and casings.

Figure 3:
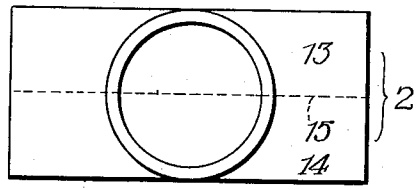
Fig. 3 is a plan of part of the shell before assembly.

The body 2 of the shell may be made, as shown in Fig. 3, of segments 13 and 14 stamped out of sheet steel and butt-welded together along the line 15. In assembling the parts, the lining is embraced between the segments 13 and 14 and the latter welded together; after which the end pieces are mounted as described and the lining flanged over them or threads cut in them as desired.

The lining may be produced in a variety of ways, several methods of production for T's being illustrated in Figs 5 to 9. The blank 16 has flanges 17 for forming the ends 18, and has flanges 19 for forming the segments which are to be joined to produce the tubular end 20. The blank is bent up to the form of Fig. 6. The edges 21 are then pressed together and butt-welded or united by some other method to produce the finished lining of Fig. 7.

Figure 8:
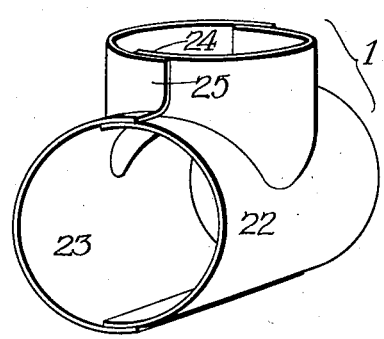
Figs. 8 and 9 are similar views of modified styles of lining.
Figure 6:
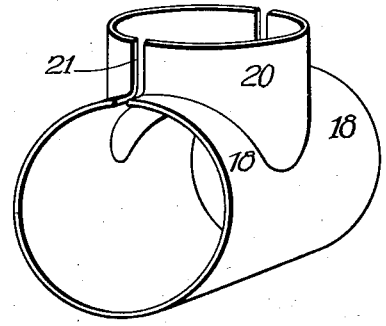
Fig. 6 is a perspective view of the same bent to final shape.

Or the metal may be stamped into two segments 22 and 23, Fig. 8, which are brought together with their edges 24 and 25 overlapping and then welded or otherwise united. The body of the outer shell will be shaped to fit this lining and even if the two segments 22 and 23 are not welded together they will be held in place by their shape and particularly if they are flanged over the end pieces as in Fig. 1.

Figure 7:
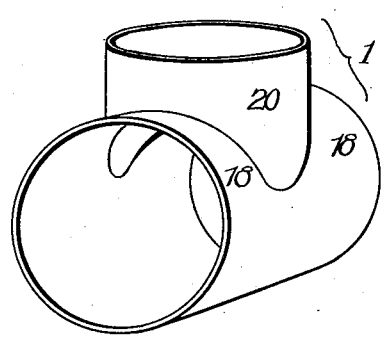
Fig. 7 is a similar view with the edges united.
Figure 9:
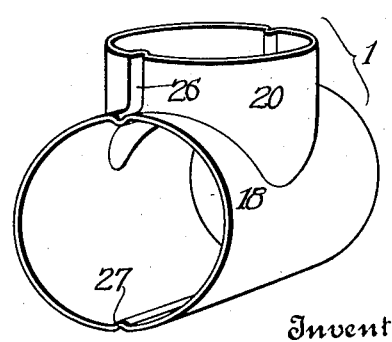

Fig. 9 illustrates a lining similar to Fig. 7 but provided with grooves 26 and 27 in the plane of the axes of the parts, into which the body of the shell may be shaped to fit so as to lock the parts tightly together.

The joints at the edges for each of the above cases may be made by soldering, by various welding methods, or by mechanical connection.

It is not essential that the lining be of copper or brass. There are various other metals, particularly special steels and steel alloys, which are useful as linings because of their resistance to corrosion, and still other metals which might be used to resist the action of special fluids which are to be passed through the piping.

The end pieces may be economically stamped out as complete rings, or as segments which are afterwards welded together. Or they may be cast or forged where the thickness or other special circumstances make such methods advisable.

Though I have described with great particularity of detail certain embodiments of my invention, yet it is not to be understood therefrom that the invention is restricted to the particular embodiments shown. Various modifications thereof may be made by those skilled in the art without departure from the invention as defined in the following claims.

What I claim is:—

1. A pipe fitting having a lining stamped out of sheet metal and bent into shape with its edges united and an outer shell closely fitting said lining and formed of segments united at their edges.

2. The pipe fitting of claim 1 having separately formed end pieces welded to the ends of the outer shell.

3. A pipe fitting having portions thereof at an angle to each other and comprising a lining stamped out of sheet metal and bent into shape with its edges united and an outer shell closely fitting said lining and formed of segments welded together at their edges.

4. A pipe fitting having portions thereof at an angle to each other and comprising a lining stamped out of sheet metal and bent into shape with its edges united, an outer shell closely fitting said lining and formed of segments welded together at their edges and end pieces overlapping the ends and the outer surfaces of said outer shell and welded thereto.

5. A pipe fitting having portions thereof at an angle to each other and comprising a lining of sheet metal, an outer shell closely fitting said lining and formed of segments welded together at their edges and end pieces welded to the ends of the outer shell and having marginal portions projecting beyond the inner faces of the body and lining.

In witness whereof, I have hereunto signed my name.

THOMAS E. MURRAY.